Figure 1:
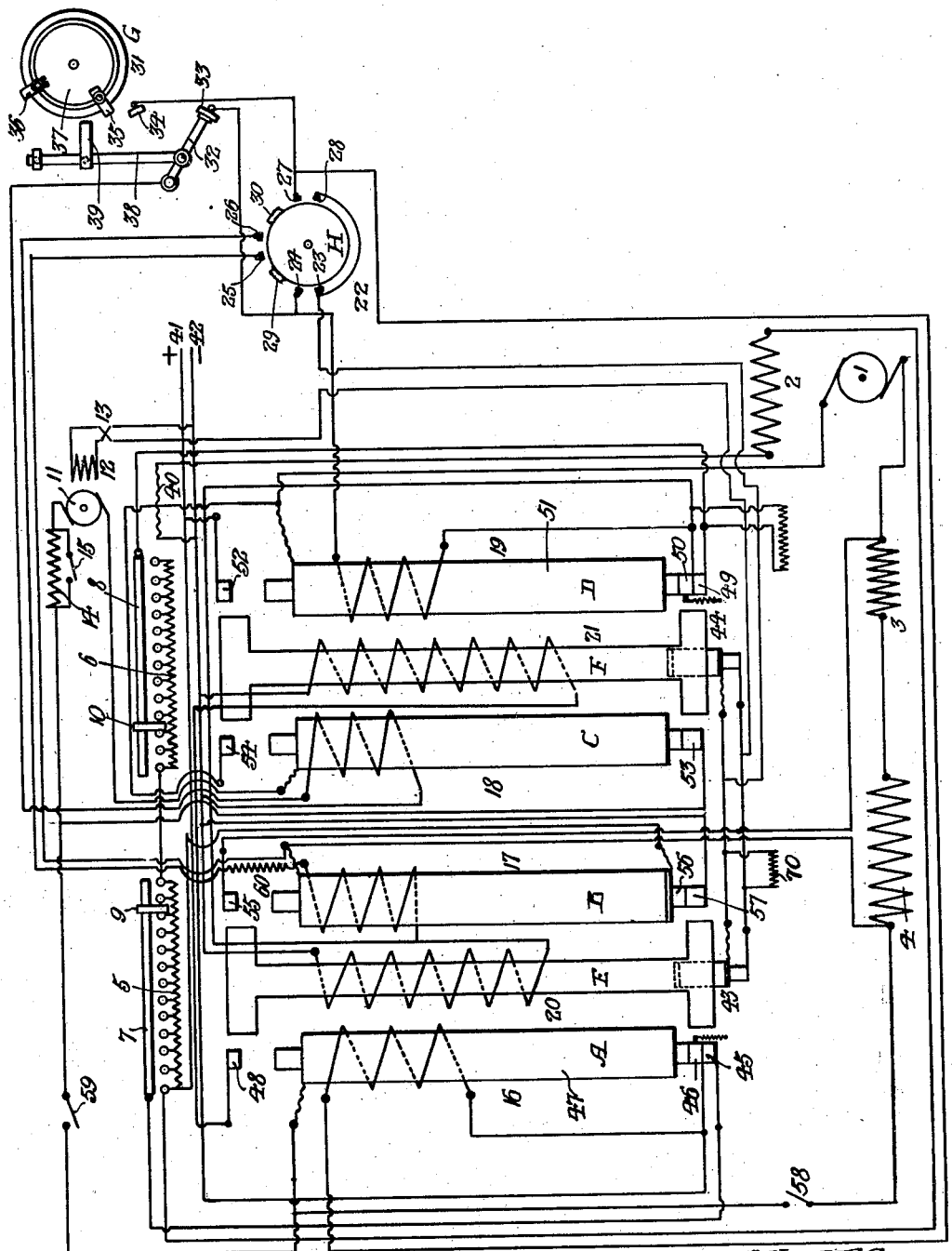

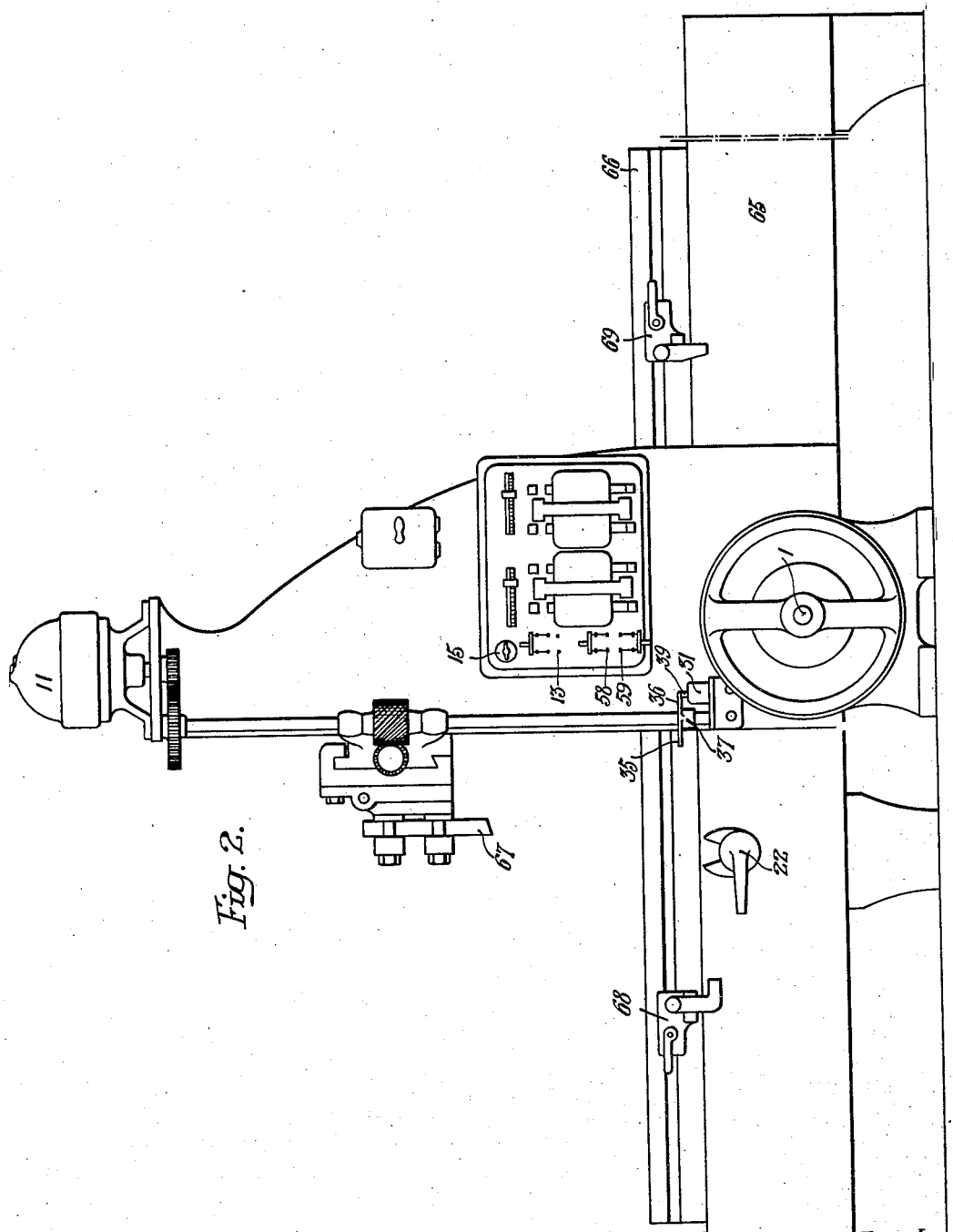

UNITED STATES PATENT OFFICE.

WILLARD T. SEARS, OF PHILADELPHIA, PENNSYLVANIA, AND SAMUEL H. KEEFER, OF PLAINFIELD, NEW JERSEY, ASSIGNORS TO NILES-BEMENT-POND COMPANY, OF JERSEY CITY, NEW JERSEY, A CORPORATION OF NEW JERSEY.

SYSTEM OF MOTOR CONTROL.

996,529.   Specification of Letters Patent.   Patented June 27, 1911.

Application filed October 28, 1910. Serial No. 589,567.

*To all whom it may concern:*

Be it known that we, WILLARD T. SEARS and SAMUEL H. KEEFER, citizens of the United States, and residents of Philadelphia, county of Philadelphia, State of Pennsylvania, and Plainfield, county of Union, State of New Jersey, respectively, have invented certain Improvements in Systems of Motor Control, of which the following is a specification.

This invention has to do with that class of machines such as machine tools which employ two electric motors, one for driving a table with the work operated on and another for feeding the tool, actuating a cross rail, elevating a head, traversing a saddle, or the like.

One object of the invention therefore is to provide a system of apparatus and the necessary connections whereby a pilot switch controlled either manually or automatically shall govern the starting, stopping, and reversing of a drive motor as well as of a feed motor; the arrangement of parts being such that it shall be possible to adjust the feed motor for either direction of operation of the driving motor or of the driven part.

It is further desired to provide a system having the above characteristics in which the feed motor may be controlled and operated either independently of or in connection with the driving motor; the invention further contemplating apparatus and connections whereby the feed motor, after making a predetermined number of revolutions, may be caused to act as a generator so as to brake and quickly bring to rest the mechanism connected to it.

Another object of the invention is to provide a system of apparatus, including a driving motor and a feed motor, with the necessary apparatus and connections whereby the feed motor may be employed independently of the driving motor for any of a number of operations.

These objects and other advantageous ends we secure as hereinafter set forth, reference being had to the accompanying drawings, in which:—

Figure 1, is a diagrammatic representation of a motor controlling system arranged and connected according to our invention, and Fig. 2, is a side elevation, to some extent diagrammatic, showing our invention as applied to a machine tool.

In Fig. 1 of the above drawings 1 represents a driving motor having a field winding 2 and provided in the present instance with an interpole field winding 3 and a body of armature resistance 4; this latter winding and the resistance being connected in series with said armature. Two banks of field resistance 5 and 6 are also provided and each of these has a set of contacts, adjacent which are elongated contact plates indicated at 7 and 8 respectively; there being sliding contacts 9 and 10 operative over these plates and their adjacent contacts whereby it is possible to vary the amount of resistance of either bank in circuit. The feed motor 11 has its field winding 12 connected between the current supply mains in circuit with a reversing switch 13, whereby the direction of current flow through it may be reversed to change the direction of rotation of the armature. This motor is also provided with a bank of armature resistance 14 connected in series with its armature and having a switch 15 in shunt to it, whereby when it is desired to speed up the motor, said resistance may be short circuited.

For controlling the operation of the motors we provide four solenoids 16, 17, 18 and 19, grouped in pairs and each controlling two sets of contacts. Between the solenoids 16 and 17 we mount a blow out magnet 20 having T-shaped core ends extended adjacent the switch contacts controlled by said solenoids so as to prevent the formation of destructive arcs between them, and similarly the solenoids 18 and 19 have mounted between them a blow-out magnet 21 also provided with a core having T-shaped ends extending in the vicinity of their contacts.

The main pilot switch 22 is mounted so as to be operative either manually or by means of the table 66 actuated by the driving motor 1 and it has three pairs of fixed contacts numbered from 23 to 28 inclusive, as well as two movable contacts 29 and 30. These latter are carried on a suitable supporting structure of insulating material in such positions that the first is capable of electrically connecting the contacts 23 and 24 or the contacts 25 and 26, while the second is capable of similarly connecting this latter pair of contacts or the contacts 27 and 28. Moreover, these two movable contacts are so placed that when one engages one pair of contacts, the other engages a second pair of contacts. In addition to this pilot switch there is a second or feed motor switch 31 consisting of an arm 32 so mounted as to be capable of engaging either of two contacts 33 and 34 and designed to be actuated by a pair of dogs 35 and 36 adjustably mounted on a supporting structure 37 connected to the armature of the feed motor 11 so as to be driven thereby.

A slidable bar 38 is connected to the switch arm 32 and has a projection 39 in position to be engaged by either of the dogs 35 and 36 for shifting said arm out of engagement with one of the contacts 33 or 34 into engagement with the other. As a protection to the motor field we connect a choke coil 40 across the current supply mains 41 and 42 and place in series with the current supply line for the various solenoid windings, a pair of switches 43 and 44, respectively controlled by the two blow-out magnets 20 and 21 so as to be held in an open position and thereby interpose in circuit with them the resistance 70 whenever both of said magnets are simultaneously energized. While any suitable switches may be employed for accomplishing this end, we preferably construct them as described and claimed in Samuel H. Keefer's application for Patent No. 545,134, filed February 21, 1910.

The two solenoids 16 and 19, which with their associated contacts are primarily intended to serve as the reversing and braking means for the driving motor 1, are also intended to each control a double switch when their cores or movable elements are in their lower positions and their windings are deenergized. The first of these switches consists of a fixed contact 45 capable of engagement by a movable contact 46, which in turn is placed to be engaged by the lower end of the core or movable member 47 of the solenoid, and the mounting and arrangement of the parts is such that when said core is raised into engagement with the upper contact 48, the spring supported contact 46 moves away from the fixed contact 45 and immediately afterward is separated from engagement with the core 47. Similarly the solenoid 19 has below it a fixed contact 49 and a spring contact 50 placed in such position as to be held in engagement with each other by the core 51 when this latter is in its lower position, while being free to swing apart and out of engagement with said core when the latter is in its raised position in engagement with the upper fixed contact 52.

The core of the solenoid 18 in its lower position engages a fixed contact 53 and in its upper position engages a fixed contact 54, while the core of the solenoid 17 in its upper position engages the contact 55. This latter core has fixed to its lower end a contact 56 which, though insulated from said core, is placed to engage a fixed contact 57 when in its lower position.

In the armature circuit of the driving motor 1 we place a switch 58 and connect a second switch 59 in the circuit of the feed motor armature so that either of these motors may be cut out to permit of the independent operation of the other.

Without tracing in detail the various connections between the apparatus above noted, it will be seen that when current is supplied to the mains 41 and 42, the field winding 2 of the driving motor is energized to its full strength, the flow being from the positive main to said field winding; through the switch formed by the contacts 56 and 57 and thence to the negative main 42. Similarly the field winding 12 of the feed motor is energized from the mains 41 and 42, and the direction of current flow through it may be governed by the reversing switch 13 which may be of any desired construction.

In Fig. 2, we have shown a planer equipped with our invention, the bed 65 having mounted on it a reciprocating table 66 driven by the motor. In this case the feed motor is mounted on the cross rail and is designed to feed the tool 67 across the table. If the pilot switch 22 be mounted so as to be periodically shifted by dogs 68 and 69 mounted on the table 66 and it be in such position that its contact 29 connects the fixed contacts 23 and 24 while its contact 30 connects the contacts 25 and 26, then the operations hereafter noted will take place. Current will flow from the positive supply main 41, through the contacts 23, 29 and 24 of the pilot switch 22, thence through the winding of the solenoid 19, to the winding of the blow out magnet 20 and to the negative main. This will at once cause raising of the core 51, which by engaging the upper fixed contact 52, permits current to flow from the positive main 41 to said contact 52 and thence to the core 51. From here the current passes to the armature 1 of the drive motor, through the winding 3 and resistance 4 to the core 47 of the solenoid 16, which being in its lower position, is in electrical connection with the contact 46. From this latter the current flows through the blow-out magnet 21 and thence to the negative main 42. The drive motor 1 now starts, since its shunt field winding 2 receives current from the positive supply main 41 and is connected with the negative supply main 42 through the contacts 56 and 57 of the solenoid 17. The armature of said motor shortly assumes a definite speed with the winding 3 and resistance 4 in circuit, and the table 66 is therefore moved on its cutting stroke. In the meanwhile, if it be assumed that the arm 32 of the feed switch 31 be in its lower position, current also flows from the positive current supply main 41 through the contacts 23, 29 and 24 of the pilot switch 22, through the contacts 33 and arm 32 of the feed switch 31, thence to the winding of the solenoid 18 and to the negative supply main 42. Said winding is caused to move its core into engagement with the contact 54 so that current is free to flow from the positive main 41, through the contact 52, core 51 of the solenoid 19, contact 54 and core of the solenoid 18, thence to the armature 11 of the feed motor, through the armature resistance 14 of said motor, core 47 of solenoid 16, contact 46 and blowout magnet 21, to the negative main 42. Since the field winding 12 of the feed motor is excited as previously noted, this motor at once starts and through appropriate mechanism moves the tool 67 of the machine to which it is attached until the continued rotation of its armature so far turns the plate 37 as to bring the dog 35 into engagement with the projection 39, thereby moving the arm 32 out of engagement with the contact 33 and moving it into engagement with the contact 34. As soon, however, as the said arm disengages the contact 33, the winding of the solenoid 18 is deënergized and its core at once drops, breaking the supply circuit to the armature of the feed motor 11 and immediately thereafter causing said armature to be short circuited through the resistance 14. The feed motor now acts as a generator and current flows from its armature to the core of the solenoid 18, contact 53, and thence returns to the armature through the resistance 14. The armature of this motor, with its attached mechanism is thus quickly brought to rest; it being understood that the starting, operation and stopping of said motor is so timed as to occur before the cutting tool controlled by it is engaged with the work on the table 66 moved by the drive motor. This latter motor 1 continues its operation until such time as the dog 68 engages the pilot switch 22 and so moves it as to bring its contact 29 into engagement with the contacts 25 and 26 and its contact 30 into engagement with the contacts 27 and 28. The first movement, however, of such pilot switch breaks the connection between the contacts 23 and 24, so that the windings of the solenoids 17 and 19 are deënergized and their cores drop, with the result that the armature of the drive motor is connected in a closed circuit with the winding 3 and the resistance 4. Said motor then acts as a generator, current passing from its armature, through the winding 3 and resistance 4 to the core 47 of the solenoid 16, to the contact 46, blow out magnets 21 and 20, contact 50, core 51 of solenoid 19 and thence back to said armature. This latter is therefore quickly brought to rest in the well known manner and it is to be noted that as long as any appreciable current is flowing through the blow out magnets 20 and 21, neither of the solenoids 16 nor 19 can be sufficiently energized because both of the switches 43 and 44 are maintained open by reason of the attraction of their armatures toward said magnets and the resistance 70 and 71 is in series with them. When, however, the armature of the drive motor has so far slowed down as to cause it to cease generating an appreciable current, the blow out magnets are deënergized and permit the switches 43 and 44 to close, thereby permitting an energizing current to pass from the positive supply main 41 to the contact 28 of the pilot switch 22, thence through the contacts 30 and 27 to the winding of the solenoid 16, and through the blow out magnet 21 to the negative supply main. The raising of the core 47 of this solenoid 16 and its engagement with the contact 48 then permits current to flow from the positive supply main through said contact and the core, through the resistance 4, winding 3, and armature of the drive motor 1, thence through the core 51 of the solenoid 19, contact 50, and blow out magnet 20 to the negative supply main. Since the direction of flow of current through the field winding 2 is unchanged, this reversal of current flow in the armature results in a reversal of the direction of rotation thereof and in this case, since the contact 25 of the pilot switch 22 is connected between the armature resistance 4 and the positive supply main, current will flow from said main to the contact 48 and core 47 to one end of the resistance 4, thence through the contacts 25, 29, and 26 of the pilot switch 22, through a body of resistance 60, winding of solenoid 17, blow out magnet 20 and to the negative supply main. Thus while on the working stroke of the motor the winding 3 and resistance 4 remain in circuit with the armature 1, the energization of the winding of the solenoid 17 causes its core to engage the contact 55, thereby short circuiting said winding and resistance and permitting the motor to accomplish its return stroke at a materially increased speed. In addition it will be noted that where, during the forward stroke of the motor, the field winding 2 was connected to the negative supply main through the contacts 56 and 57, owing to the fact that these contacts are separated by the raising of the core 17, more or less of the resistance 5 and 6 is now connected in series with said field winding; the current flowing from the slider 10 engaging the contact terminals of the resistance 6, to the plate 8, thence through the contacts 49 and 50 and blow out magnet 20 to the negative supply main. This consequent weakening of the shunt field also results in an increase of the motor speed, so that while the forward stroke is made at a relatively slow rate, the reverse stroke is taken at high speed.

As soon as the closure of the switches 43 and 44 permits current to flow from the positive supply main to the contact 28 of the pilot switch 22 in order to start the reverse stroke of the drive motor, it is likewise free to pass through the contacts 30 and 27 to the contact 34 of the feed motor switch so that the circuit of the winding of the solenoid 18 is agan completed from this latter contact through the arm 32.

As before, the raising of the core of the solenoid 18 completes the armature circuit of the feed motor, the current passing from the positive supply main to the contact 48, core 47 of solenoid 16, resistance 14, armature 11 of said motor, core of the solenoid 18, contact 54, core 51 of solenoid 19, contact 50 and thence to the negative supply main through the blow out magnet 20. Since, however, the current flow through the armature 11 is in a direction opposite to that previously noted, the feed motor is again started but in an opposite direction, and continues in operation until the plate 37 has been turned by it sufficiently to bring the dog 36 thereon into engagement with the projection 39, when the arm 32 of the feed switch is again moved away from the contact 34 into engagement with the contact 33; the solenoid acting as before to cause the feed motor armature to be connected in a closed circuit and made to brake itself and its attached mechanism as previously described. It is of course understood that this reverse operation of the feed motor may move a pawl idly back over a ratchet wheel preparatory to another forward operation of said motor to feed the tool. As soon, therefore, as the switches 43 and 44 close, current is delivered through the winding of the solenoid 19 and the above described cycle of operations is again followed. As will be understood by those skilled in the art, the speed of the driving motor 1 may be widely varied for its forward and reverse movements by the adjustment of the sliders 9 and 10 and the consequent variation of the amount of resistance in circuit with the shunt.

By opening the switch 59 the feed motor 11 is prevented from receiving current so that it is possible to operate the driving motor by the automatic mechanism above described, while the tool can be fed by hand or otherwise. Similarly, the switch 58 may be opened and the switch 59 closed, when by suitably manipulating the pilot switch 22, the feed motor may be operated to shift the tool to any desired extent or to actuate any other device or portion of the machine to which it is connected. Moreover, by closing the switch 15 the armature resistance 14 of the feed motor 11 is short circuited, thereby permitting a larger current to flow through the armature thereof and consequently increasing its speed.

While throughout the specification we have referred to the motor 1 as the driving motor and the motor 2 as the feed motor, it is to be understood that the functions of these two machines are in no way limited by these terms, for so far as our invention is concerned it is absolutely immaterial what work is done or what devices are driven by the said motors.

We claim:—

1. The combination of an electric motor; electro-magnetic mechanism for controlling the same; a pilot switch for governing said mechanism; a second motor also controlled by said mechanism; and a switch actuated by the second motor for governing its operation.

2. The combination of an electric motor; electro-magnetic mechanism for controlling the same; a pilot switch actuated from said motor for governing said mechanism; a second motor also controlled by said mechanism; and a switch actuated by the second motor for governing its operation.

3. A system including two motors; electro-magnetic mechanism for controlling the flow of current to the same; a pilot switch for governing said mechanism; a switch actuated by one of the motors for also governing the flow of current thereto, the circuit of said second switch being controlled by the pilot switch.

4. A system of motor control including two motors; electro-magnetic mechanism for controlling the flow of current to said motors; a switch actuated by one of the motors and in circuit with the part of the electro-magnetic mechanism for controlling said motor; with a pilot switch governing the electro-magnetic mechanism and connected in circuit with said first switch.

5. A system of motor control consisting of a drive motor and a feed motor; electro-magnetic mechanism for controlling the flow of current to said motors; with a pilot switch for governing the operation of said mechanism; and a second switch actuated by the feed motor for causing the current to be cut off from the same after it has made a predetermined number of revolutions.

6. A system of motor control consisting of a drive motor and a feed motor; electro-magnetic mechanism including reversing means for controlling the flow of current to said motors; with a pilot switch for governing the operation of said mechanism; and a second switch actuated by the feed motor for causing the current to be cut off from the same after it has made a predetermined number of revolutions.

7. A motor controlling system including a driving motor, and a feed motor; electro-magnetic mechanism for controlling the flow of current to said motors; and two switches respectively actuated by said motors; one of said switches controlling the flow of current to the electro-magnetic mechanism, and also controlling the flow of current to the other switch.

8. A motor controlling system consisting of two motors, electro-magnetic mechanism for controlling the flow of current to said motors; a pilot switch for governing the flow of current to said mechanism; with a second pilot switch in circuit with the first switch and placed to be actuated from one of the motors; said electro-magnetic mechanism including means for short circuiting the armature of the said motor after its pilot switch has been opened.

9. A motor controlling system consisting of two motors; electro-magnetic mechanism for controlling the flow of current to said motors; a pilot switch for governing the flow of current to said mechanism; with a second pilot switch in circuit with the first switch and placed to be actuated from one of the motors; said electro-magnetic mechanism including means for short circuiting the armature of said motor after its pilot switch has been opened, and also including means for short circuiting the armature of the driving motor when its pilot switch is open.

10. A motor controlling system consisting of two motors; two solenoids having contacts and connections constituting a reversing switch for one of the motors; a third solenoid having contacts in circuit with certain of those of the other solenoids to form a reversing switch for the second motor; and a pilot switch for controlling the flow of current to said solenoids.

11. A motor controlling system consisting of two motors; two solenoids having contacts and connections constituting a reversing switch for one of the motors; a third solenoid having contacts coöperating with certain of those of the other solenoids to form a reversing switch for the second motor; and a pilot switch for controlling the flow of current to said solenoids; said reversing switches including connections for placing said motors in closed circuits.

12. A motor controlling system consisting of a motor; a body of armature resistance therefor; electro-magnetic switches for governing the flow of current to said motor; one of said switches being connected in shunt to the said resistance; and a pilot switch for governing the flow of current to the electro-magnetic switches; the magnet of the resistance controlling switch being connected to be energized only when the motor is turned in one of its two possible directions.

In testimony whereof, we have signed our names to this specification, in the presence of two subscribing witnesses.

WILLARD T. SEARS.
SAMUEL H. KEEFER.

Witnesses to the signature of Willard T. Sears:
CHARLES W. ARRISON,
R. RAYMOND PORTER.

Witnesses to the signature of Samuel H. Keefer:
J. M. MURRAY,
C. W. BEILER.